United States Patent [19]

Hashimoto et al.

[11] Patent Number: 4,829,591

[45] Date of Patent: May 9, 1989

[54] PORTABLE RADIO

[75] Inventors: Kazuya Hashimoto; Hiroshi Asazawa, both of Tokyo, Japan

[73] Assignee: NEC Corporation, Japan

[21] Appl. No.: 897,989

[22] Filed: Aug. 19, 1986

[30] Foreign Application Priority Data

Aug. 29, 1985 [JP] Japan ................................ 60-190547

[51] Int. Cl.[4] ................................................ H04B 1/06

[52] U.S. Cl. ....................................... 455/89; 455/133; 455/277

[58] Field of Search ....................... 455/88, 89, 90, 95, 455/128, 129, 347, 351, 132, 274, 133–135, 277, 272; 343/702; 375/100

[56] References Cited

U.S. PATENT DOCUMENTS

| | | | |
|---|---|---|---|
| 3,277,374 | 10/1966 | Kobayashi | 455/88 |
| 3,887,872 | 6/1975 | Sharpe | 455/132 |
| 4,035,728 | 7/1977 | Ishikawa et al. | 455/132 |
| 4,060,766 | 11/1977 | Kazuo | 455/133 |
| 4,178,548 | 12/1979 | Thompson | 455/89 |
| 4,524,461 | 6/1985 | Kostanty et al. | 455/89 |
| 4,538,153 | 8/1985 | Taga | 455/277 |
| 4,543,581 | 9/1985 | Nemet | 343/702 |
| 4,545,071 | 10/1985 | Freeburg | 455/33 |
| 4,633,519 | 12/1986 | Gotoh et al. | 455/134 |
| 4,641,366 | 2/1987 | Yokoyama et al. | 455/89 |
| 4,726,070 | 2/1988 | Buzzi | 455/89 |

FOREIGN PATENT DOCUMENTS

| | | | |
|---|---|---|---|
| 2651954 | 5/1978 | Fed. Rep. of Germany | 455/132 |
| 59-77724 | 5/1984 | Japan | 455/89 |
| 60-47502 | 3/1985 | Japan . | |

*Primary Examiner*—Robert L. Griffin
*Assistant Examiner*—Curtis Kuntz
*Attorney, Agent, or Firm*—Laff, Whitesel, Conte & Saret

[57] ABSTRACT

A portable transceiver has a narrow band square microstrip antenna connected to a first radio receiver, a wideband sleeve or whip antenna connected to an associated duplexer, and a second radio receiver and a transmitter both connected to the wideband antenna via the duplexer. The square microstrip antenna if formed of a conductive emission plate and a conductive ground plate joined by a conductive connector plate. A housing enclosing the transceiver has an earphone and microphone set in its front side, the microstrip antenna under its back side, and the wideband sleeve or whip antenna mounted upright on its top side.

6 Claims, 4 Drawing Sheets

PORTABLE RADIO

This inventlon relates to portable radios, and more particularly to portable receivers and transceivers utilizing diversity reception.

Conventional portable receivers have a single antenna and conventional transceivers use the same antenna for both sending and receiving. The single antenna typically is a sleeve antenna, whip antenna, or microstrip antenna dimensioned to have the necessary antenna bandwidth.

However, such portable radios often suffer from noise in the received signal due to an undesirable phenomena called Rayleigh fading in which there are wide fluctuations in the strength of the received signal. Diversity reception using a pair of antennas with a suitable receiving circuit is a promising means for reducing the noise in the received signal.

Unfortunately, doubling the number of antennas can add undesirable bulk and weight to a portable unit. Moreover, the two antennas become so close together that without careful design there is likely to be a substantial undesirable mutual coupling between them, complicating such characteristics as impedance, directionality and radiation pattern.

Therefore, an object of the present invention is to provide a portable radio unit having a dual antenna system for diversity reception that overcomes these problems. Another object is to provide such a radio unit without sacrificing such features as ruggedness, ease of use, and pleasing appearance. Yet another object of the invention is to provide such a dual antenna radio unit especially adapted for use as a portable transceiver.

In keeping with one aspect of this invention, a portable transceiver has a separate microstrip antenna connected to a first radio receiver. A wideband sleeve or whip antenna is connected to an associated duplexer. Both a second radio receiver and a transmitter are connected to the wideband antenna, via the duplexer. The square microstrip antenna is formed of a conductive emission or radiating plate and a conductive ground plate joined by a conductive connector plate. A housing enclosing the transceiver has an earphone. A microphone is set in its front side, the microstrip antenna under its back side. The wideband sleeve or whip antenna is mounted upright on its top side.

BRIEF DESCRIPTION OF THE DRAWINGS

The above mentioned and other features of this invention and the manner of obtaining them will become more apparent, and the invention itself will be best understood, by reference to the following description of an embodiment of the invention taken in conjunction with the accompanying drawings, in which.

Figure 2A:
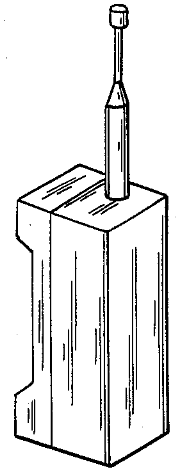
FIG.2A (PRIOR ART)
FIG. 2A is a perspective view of a prior art portable transceiver having a sleeve antenna.
Figure 2B:
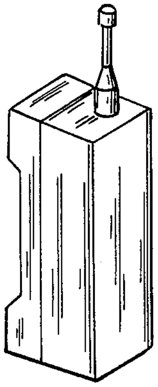
FIG.2B (PRIOR ART)
FIG. 2B is a perspective view of a prior art portable transceiver having a whip antenna.
Figure 2C:
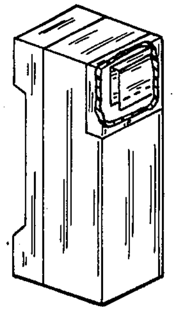
FIG.2C (PRIOR ART)
FIG. 2C is a perspective view of a prior art portable transceiver having a microstrip antenna.

As mentioned above, we may classify conventional portable radios by the kind of antenna they include. There are various types, such as those having a vertical half-wave sleeve antenna (FIG. 2A), a vertical quarter-wave whip antenna (FIG. 2B), or a square microstrip antenna (FIG. 2C).

When such factors as performance, ease of use, portability, and cost are considered, diversity reception using two spaced-apart antennas is highly desirable in a portable radio. For example, corresponding to each single antenna transceiver of FIGS. 2A, 2B, and 2C, a dual antenna diversity transceiver could be constructed using two antennas of the same type, as shown in FIGS. 3A, 3B, and 3C.

Figure 3C:
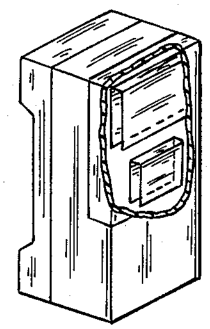
FIG. 3C is a perspective view of a portable transceiver having two microstrip antennas.
Figure 3A:
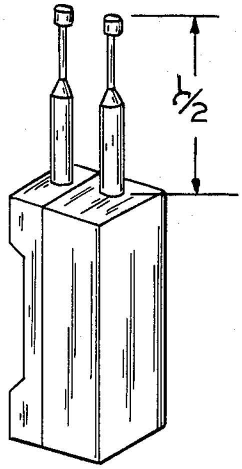
FIG. 3A is a perspective view of a portable transceiver having twin sleeve antennas.
Figure 3B:
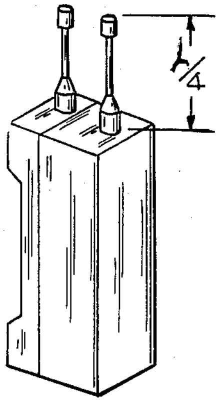
FIG. 3B is a perspective view of a portable transceiver having twin whip antennas.

The diversity transceiver of FIG. 3A is furnished with twin sleeve antennas, and the transceiver of FIG. 3B is furnished with twin whip antennas. However, because the two similar antenna poles are disposed very close together, their mutual coupling is strong, so that they affect each other's characteristics, such as impedance, directionality, and radiation pattern, which causes design complications. Moreover, such a clumsy construction is not esthetically pleasing.

The diversity transceiver of FIG. 3C is furnished with two microstrip antennas. The antennas do not protrude from the receiver's housing, which improves the unit's portability and ease of use. However, the interior space occupied by the antenna section is increased, reducing the space available for such things as the battery and electrical circuits. Therefore, this design is also inconvenient to use in practice.

Figure 4A:
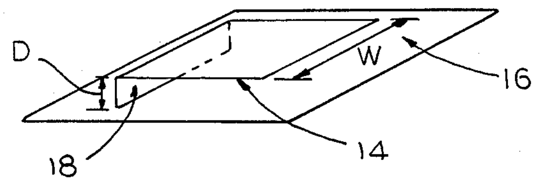
FIG. 4A is a sketch defining the width W and thickness D of a square microstrip antenna.
Figure 4B:
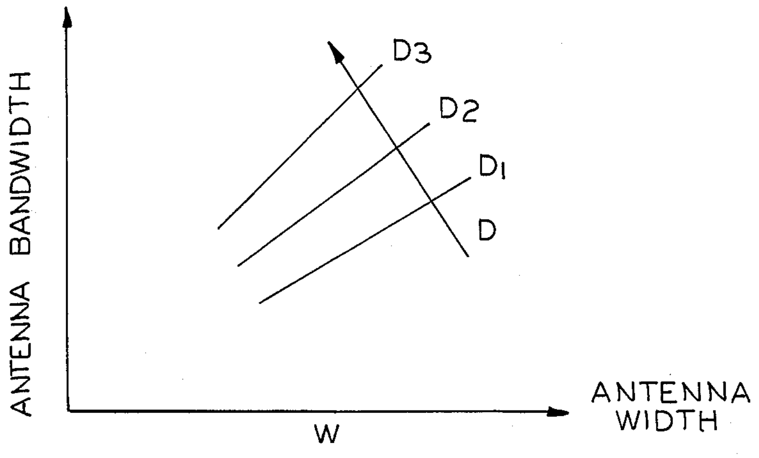
FIG. 4B is a graph showing how the antenna bandwidth depends on the width and thickness of the antenna shown in FIG. 4A.

Another problem with such internal microstrip antennas is that the size increases if a wide antenna bandwidth is needed. As shown in FIG. 4A, this type of square microstrip antenna is formed from a conductive emission or radiating plate 14, a conductive ground plate 16, and a conductive connector plate 18 which connects together the emission and ground plates. This antenna has a thickness D and width W. FIG. 4B shows generally how the antenna bandwidth depends upon these two dimensions. To increase the antenna bandwidth, it is necessary to expand the strip antenna's size, either the thickness D or width W.

It follows that if the construction of FIG. 3C is tried for a portable transceiver used in a wideband system, the strip antennas will end up rather large, which makes it difficult to actually employ such a design. Moreover, two strip antennas disposed as shown in FIG. 3C inconveniently affect each other's characteristics, such as impedance, directionality, and radiation pattern, because their mutual coupling is strong.

Accordingly, the present invention provides a portable radio unit having a dual antenna system for diversity reception that overcomes these problems without sacrificing ruggedness, ease of use, and pleasing appearance. More particularly, the invention provides an improved dual antenna radio unit especially useful in a portable transceiver.

Figure 1A:
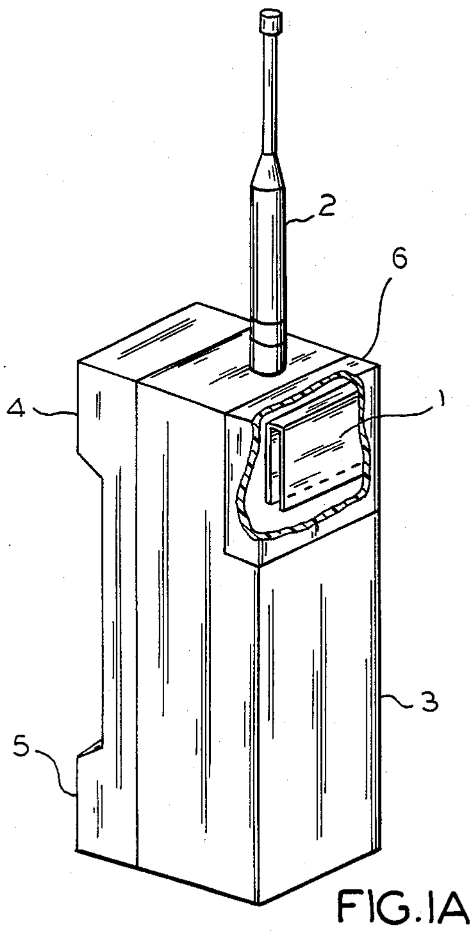
FIG. 1A is a perspective view of a portable transceiver embodiment utilizing the invention.
Figure 1B:
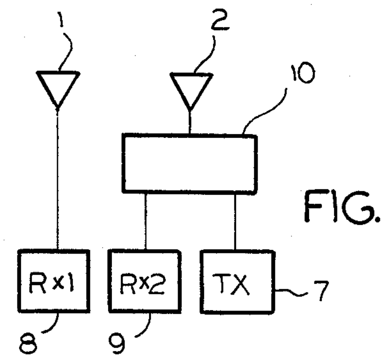
FIG. 1B is a functional block diagram of the transceiver of FIG. 1A.

FIG. 1A is a perspective view of an inventive transceiver, and FIG. 1B shows a functional block diagram of the embodiment of FIG. 1A. For diversity reception the transceiver has two antennas, a square microstrip antenna 1 protected by an antenna cover 6, and a sleeve antenna 2 protruding above a top side of housing 3. Facing the user are an earphone 4 and a microphone 5.

As shown in FIG. 1B, in addition to antennas 1 and 2, the transceiver includes a first receiver 8 that receives signals picked up by microstrip antenna 1. A transmitter 7 and a second receiver 9 make common use of the sleeve antenna 2 by means of a duplexer 10. Therefore, sleeve antenna 2 is used in common for both transmission and reception of signals, whereas square strip antenna 1 is exclusively used as a receiving antenna.

Figure 5:
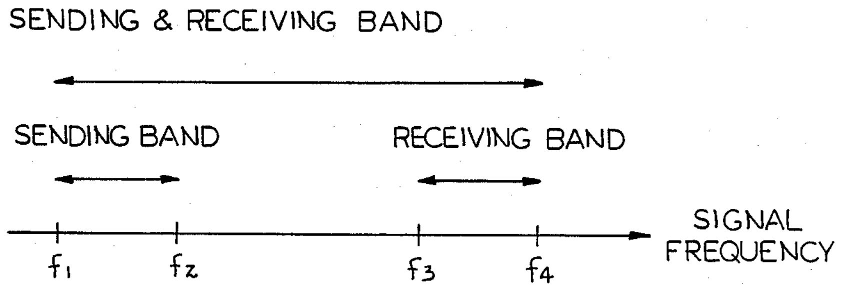
FIG. 5 is a graph showing an example of the frequencies used for sending and receiving by a portable transceiver.

If a transceiver system accommodates simultaneous transmission and reception of signals, as generally shown in FIG. 5, the sending frequency band between $f_1$ and $f_2$ is separated from the receiving frequency band between $f_3$ and $f_4$ by a frequency interval $f_2$ to $f_3$. Therefore, when the same antenna is used for both transmission and reception, it generally needs to be a wideband antenna having a voltage standing wave ratio (VSWR) for frequencies in the total band between $f_1$ and $f_4$, which is prescribed amount or less.

On the other hand, an antenna used for receiving alone only needs to cover the receiving frequency band $f_3$–$f_4$, so it can be a relatively narrow band antenna.

Therefore, applying these facts to the inventive transceiver system, a sleeve antenna that can easily perform over a comparatively wide frequency band is used for the sending-receiving antenna 2 and a square microstrip antenna that can be of compact construction is used for the relatively narrow band receiving-only antenna 1.

By combining the antennas this way, even though two antennas are used for diversity, the space occupied by the two antennas is not increased by much over the space occupied by a single antenna. Therefore, portability, ease of use, etc. need not be sacrificed. It is thus possible to provide a portable transceiver that compactly and conveniently performs diversity reception.

The inventive transceiver has the projecting sleeve antenna 2 mounted on the top side of the housing 3 where it is less likely to be accidentally struck by the user during communications. Similarly, the square microstrip antenna 1 is kept out of the user's way by mounting it in the back, side opposite the earphone 4 and microphone 5, in the upper portion of the housing where it is unlikely to be covered by the user's hand when the transceiver is held.

Moreover, compared to the twin antennas shown in FIGS. 3A, 3B, and 3C, the mutual coupling between the two inventive antennas is exceptionally small. Therefore, they have little effect on each other's characteristics, which simplifies the transceiver design.

The embodiment of the invention has been described as using a wideband sleeve antenna together with a narrow band square microstrip antenna. However, since whip antennas also can be easily adapted for sufficient wideband use, the invention also includes embodiments where a whip antenna is used instead of a sleeve antenna.

As explained above, a microstrip antenna is used as a narrow band receiving-only antenna. A sleeve antenna or a whip antenna is used as a wideband common use sending-receiving antenna. The invention provides a diversity transceiver that is compact, portable, and easy to use and hold.

While the principles of the invention have been described above in connection with specific apparatus and applications, such as a portable transceiver, it is to be understood that this description is made only by way of example and not as a limitation on the scope of the invention. For example, a receive-only portable radio will benefit if the inventive two antenna system is used for diversity reception. Therefore, the claims are to be construed to cover all equivalent structures.

We claim:

1. A portable transceiver comprising a housing having a wideband antenna attached to and projecting from a first housing side, a narrow band antenna enclosed within said housing at a first location which is removed from said wideband antenna, transmitter and receiver transducers mounted on said housing at locations opposing said first location, a first receiver circuit means coupled to reproduce signals picked up by said narrow band antenna and to apply them to said receiver transducer, a duplexer means, a second receiver circuit means and a transmitter circuit means coupled through said duplexer means to said wideband antenna, said second receiver circuit means being coupled to said receiver transducer so that diversity reception is performed, said transmitter circuit means being coupled to said transmitter transducer.

2. The transceiver of claim 1 wherein said narrow band antenna includes a ground plate connected via a connector plate to a conductive emission plate.

3. The transceiver of claim 2 wherein said narrow band antenna is a square microstrip antenna.

4. The transceiver of claim 3 wherein said transmitter and receiver transducers are at spaced locations on said housing which induces a user to hold a particular end of said housing, and said first location is at a position which is remote from said particular end.

5. The transceiver of claim 4 wherein said wideband antenna is a sleeve antenna.

6. The transceiver of claim 4 wherein said wideband antenna is a whip antenna.

* * * * *